(12) United States Patent
Carter

(10) Patent No.: US 10,967,459 B2
(45) Date of Patent: Apr. 6, 2021

(54) CUSTOMIZABLE POWDER BED CONTAINMENT SYSTEMS FOR USE WITH DIRECT METAL LASER MELTING SYSTEMS

(71) Applicant: General Electric Company, Schenectady, NY (US)

(72) Inventor: William Thomas Carter, Galway, NY (US)

(73) Assignee: General Electric Company, Schenectady, NY (US)

( * ) Notice: Subject to any disclaimer, the term of this patent is extended or adjusted under 35 U.S.C. 154(b) by 393 days.

(21) Appl. No.: 15/888,770

(22) Filed: Feb. 5, 2018

(65) Prior Publication Data

US 2019/0240773 A1 Aug. 8, 2019

(51) Int. Cl.
| | | |
|---|---|---|
| *B33Y 30/00* | (2015.01) | |
| *B23K 26/342* | (2014.01) | |
| *B23K 26/08* | (2014.01) | |

(52) U.S. Cl.
CPC .......... *B23K 26/083* (2013.01); *B23K 26/342* (2015.10); *B33Y 30/00* (2014.12)

(58) Field of Classification Search
CPC ........ B22F 2003/105; B22F 2003/1056; B22F 3/1055; B23K 26/083; B23K 26/342; B23K 26/702; B23K 26/082; B23K 26/144; B33Y 30/00
USPC ............. 219/76.1, 76.12, 76.14; 425/375, 78
See application file for complete search history.

(56) References Cited

U.S. PATENT DOCUMENTS

| | | | |
|---|---|---|---|
| 5,387,380 A * | 2/1995 | Cima ...................... | B05C 19/04 264/69 |
| 7,229,586 B2 | 6/2007 | Dunlap et al. | |
| 10,315,408 B2 * | 6/2019 | Barnhart .............. | B23K 26/342 |
| 2002/0195747 A1 * | 12/2002 | Hull ...................... | B29C 64/124 264/401 |
| 2004/0248040 A1 * | 12/2004 | Mitsuoka .......... | H01L 21/31058 430/296 |
| 2013/0064707 A1 * | 3/2013 | Matsui .................. | B29C 64/165 419/61 |
| 2014/0077421 A1 * | 3/2014 | Minick ................. | B22F 3/1055 264/497 |
| 2015/0231831 A1 * | 8/2015 | El-Siblani ............. | B29C 64/241 264/401 |

(Continued)

OTHER PUBLICATIONS

Pereira et al.,"Contributions for the next generation of 3D metal printing machines", Proceedings SPIE 9353, Laser 3D Manufacturing II, San Francisco, Mar. 16, 2015.

*Primary Examiner* — Charles Cheyney
(74) *Attorney, Agent, or Firm* — Dority & Manning, P.A.

(57) ABSTRACT

A customizable powder bed containment system for use with a direct metal laser melting (DMLM) system includes a plurality of interlinkable containment walls mechanically coupable on a build plate of the DMLM system as well as mechanically coupleable to another interlinkable containment wall of the plurality of interlinkable containment walls, and at least one actuator mechanically coupled to at least one interlinkable containment wall of the plurality of interlinkable containment walls. The at least one actuator is operable to selectively raise the at least one interlinkable containment wall of the plurality of interlinkable containment walls axially relative to a build surface of the build plate.

20 Claims, 3 Drawing Sheets

(56) References Cited

U.S. PATENT DOCUMENTS

| | | |
|---|---|---|
| 2015/0239179 A1* | 8/2015 | Goto ................... B22F 3/008 |
| | | 428/206 |
| 2016/0129502 A1 | 5/2016 | Varetti |
| 2016/0318253 A1 | 11/2016 | Barnhart |
| 2016/0368050 A1 | 12/2016 | Morris et al. |
| 2017/0036404 A1 | 2/2017 | Rengers et al. |
| 2017/0120335 A1 | 5/2017 | Demuth et al. |
| 2017/0144874 A1* | 5/2017 | Huebinger ............ B66F 9/02 |
| 2017/0225227 A1 | 8/2017 | Volk |
| 2019/0134715 A1* | 5/2019 | Stammberger ........ B33Y 30/00 |
| 2019/0263063 A1* | 8/2019 | Karlsson ............ B22F 1/0003 |

* cited by examiner

CUSTOMIZABLE POWDER BED CONTAINMENT SYSTEMS FOR USE WITH DIRECT METAL LASER MELTING SYSTEMS

BACKGROUND

The field of disclosure relates generally to additive manufacturing, and more particularly, to customizable powder bed containment systems for use with direct metal laser melting ("DMLM") systems, in which a plurality of interlinkable containment walls are mounted on a build plate of the DMLM system and selectively interlinked to create a customized powder bed.

Additive manufacturing systems (also known as 3D printing systems) are used to create three-dimensional objects by forming such objects from successive layers of material. Typically, additive manufacturing systems operate under computer control (such as, for example, based upon a three-dimensional computer aided design and drafting ("CAD") model of an object to be manufactured). Build materials are wide-ranging and include, for example, materials such as metals, glasses, thermoplastics, inks, various construction materials, such as concrete, and the like.

Accordingly, in the realm of additive manufacturing systems, DMLM systems are those arranged to weld successive layers of a weldable powder, such as a metal powder, to create a desired three-dimensional object. Traditional DMLM systems include a build plate enclosed by a system of fixed powder bed containment walls. Powder is deposited on the build plate and welded, in successive layers, to construct the object. To accommodate each successive layer of powder (e.g., a deepening powder bed), the build plate is progressively lowered within the system of fixed containment walls.

Drawbacks associated with conventional DMLM systems include non-customizable powder bed containment walls and object size constraints. Other drawbacks may include powder waste, such as powder waste occurring as a result of the creation of disposable powder bed containment walls. For example, in some cases, powder bed containment walls are constructed from the weldable powder itself simultaneously with the construction of an object within the containment walls. On completion, the walls are simply discarded, resulting in wasted powder as well as increased cycle time.

BRIEF DESCRIPTION

In one aspect, a customizable powder bed containment system for use with a direct metal laser melting (DMLM) system is provided. The customizable powder bed containment system includes a plurality of interlinkable containment walls mechanically couplable on a build plate of the DMLM system as well as mechanically coupleable to another interlinkable containment wall of the plurality of interlinkable containment walls, and at least one actuator mechanically coupled to at least one interlinkable containment wall of the plurality of interlinkable containment walls. The at least one actuator is operable to selectively raise the at least one interlinkable containment wall of the plurality of interlinkable containment walls axially relative to a build surface of the build plate.

In another aspect, a kit for customizing a powder bed on a build plate of a direct metal laser melting (DMLM) system is provided. The kit includes a plurality of interlinkable containment walls. Each interlinkable containment wall of the plurality of interlinkable containment walls is mountable on the build plate of the DMLM system. Each interlinkable containment wall of the plurality of interlinkable containment walls is further configured to be selectively interlinked with at least one other interlinkable containment wall of the plurality of interlinkable containment walls.

In yet another aspect, a kit for customizing a powder bed on a build plate of a direct metal laser melting (DMLM) system is provided. The kit includes a plurality of containment walls. Each containment wall of the plurality of containment walls is engageable with at least one other containment wall of the plurality of containment walls.

DRAWINGS

These and other features, aspects, and advantages of the present disclosure will become better understood when the following detailed description is read with reference to the accompanying drawings in which like characters represent like parts throughout the drawings, wherein.

Figure 2:
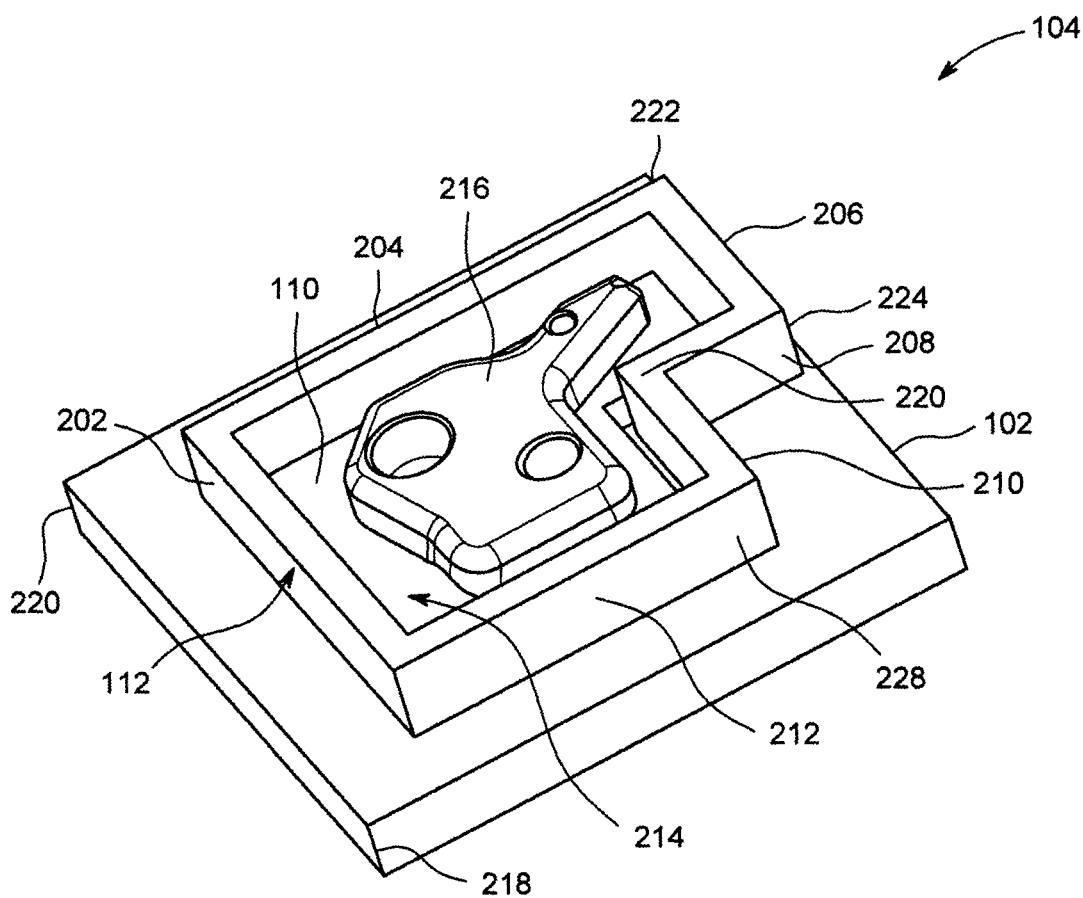
FIG. 2 is a perspective view of an exemplary customizable powder bed containment system for use with the DMLM system shown in FIG. 1.
Figure 4:
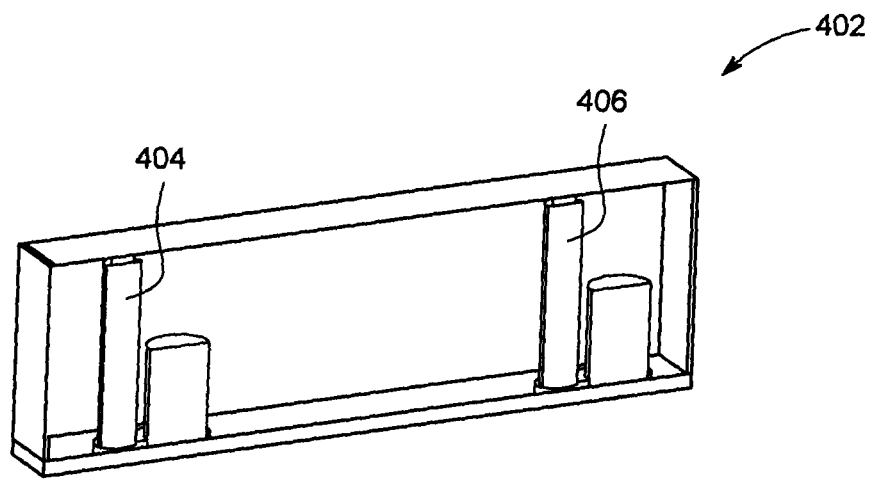
Figure 5:
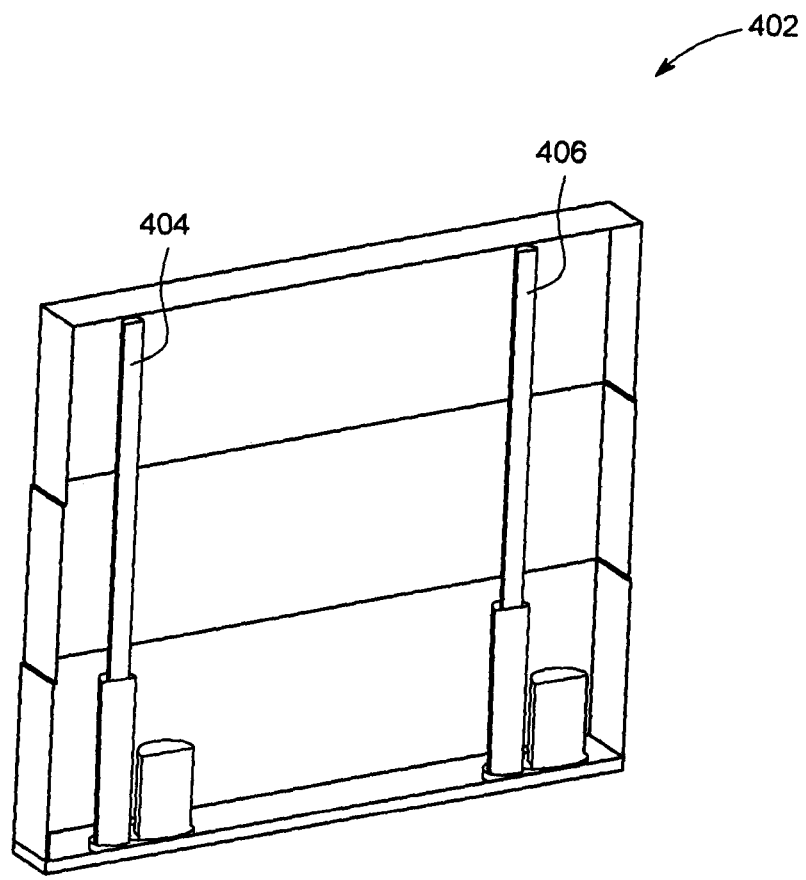

FIG. 4 is a cross-sectional view of an interlinkable containment wall of the customizable powder bed containment system shown in FIG. 2, in which the interlinkable containment wall is in a lowered position; and FIG. 5 is a cross-sectional view of an interlinkable containment wall of the customizable powder bed containment system shown in FIG. 2, in which the interlinkable containment wall is in a raised position.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, spatially relative terms, such as "beneath," "below," "under," "lower," "higher," "above," "over," and the like, may be used to describe one element or feature's relationship to one or more other elements or features as illustrated in the figures. It will be understood that such spatially relative terms are intended to encompass different orientations of the elements and features described herein both in operation as well as in addition to the orientations depicted in the figures. For example, if an element or feature in the figures is turned over, elements described as being "below" one or more other elements or features may be regarded as being "above" those elements or features. Thus, exemplary terms such as "below," "under," or "beneath" may encompass both an orientation of above and below, depending, for example, upon a relative orientation between such elements or features and one or more other elements or features.

As used herein, a "weldable powder" (or "powder") is any commercially available powder capable of and/or designed for use with a laser welding system. For example, a weldable powder may include a weldable (e.g., meltable and/or sinterable) metal powder. However, in other embodiments, a weldable powder may include a polymer or thermoplastic powder, a glass powder, and/or any other suitable weldable powder.

As used herein, an "interlinkable" containment wall is any containment wall that is capable of being mechanically coupled to (or "interlinked with") another containment wall. For example, as described herein, an interlinkable containment wall may include one or more joints, such as one or more ball and socket joints, one or more tongue and groove joints, one or more dovetail joints, and/or any other suitable joint that is capable of engaging with a similar joint of another interlinkable containment wall.

Although the additive manufacturing techniques described herein are generally described in relation to direct metal laser melting (DMLM) systems, it will be appreciated that various other additive manufacturing techniques are contemplated and within the scope of this disclosure. For example, additive manufacturing techniques suitable for implementation with the subject matter described herein may include, but are not limited to, vat photopolymerization, powder bed fusion, binder jetting, material jetting, sheet lamination, material extrusion, directed energy deposition, and the like.

Other additive manufacturing systems which may be suitable for implementation in conjunction with the present disclosure include SLA—Stereolithography Apparatus, DLP—Digital Light Processing, 3 SP—Scan, Spin, and Selectively Photocure, CLIP—Continuous Liquid Interface Production, SLS—Selective Laser Sintering, DMLS—Direct Metal Laser Sintering, SLM—Selective Laser Melting, EBM—Electron Beam Melting, SHS—Selective Heat Sintering, MJF—Multi-Jet Fusion, 3D Printing, Voxeljet, Polyjet, SCP—Smooth Curvatures Printing, MJM—Multi-Jet Modeling Projet, LOM—Laminated Object Manufacture, SDL—Selective Deposition Lamination, UAM—Ultrasonic Additive Manufacturing, FFF—Fused Filament Fabrication, FDM—Fused Deposition Modeling, LMD—Laser Metal Deposition, LENS—Laser Engineered Net Shaping, DMD—Direct Metal Deposition, Hybrid Systems, and combinations of these processes and systems. In some cases, the additive manufacturing techniques listed above may employ, for example, and without limitation, any suitable form of electromagnetic radiation, heating, sintering, melting, curing, binding, consolidating, pressing, embedding, and/or combinations thereof.

Embodiments of the present disclosure relate to a customizable powder bed containment system in which a plurality of interlinkable containment walls are selectively interlinked or joined to form a customized powder bed on a build plate of a direct metal laser melting (DMLM) system. The interlinkable containment walls may be of different shapes and/or sizes and may be interlinked on the build plate to conform to the shape of, or approximately surround, an object to be welded. In addition, the interlinkable containment walls are configured to reciprocally engage with one another and are also capable of disengaging, such that the walls can be repeatedly reconfigured to accommodate objects of varying shapes and sizes.

Figure 1:
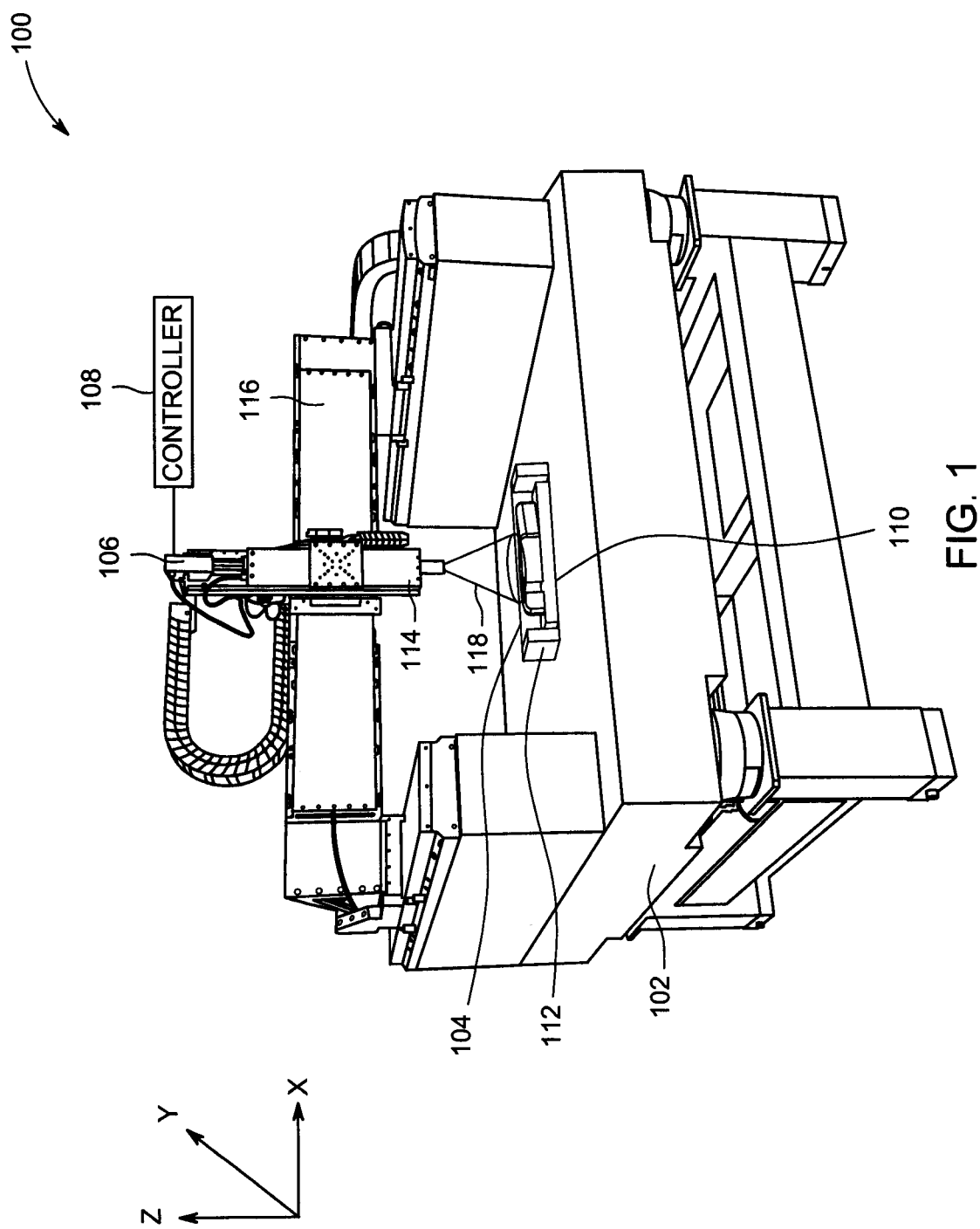
FIG. 1 is a perspective view of an exemplary direct metal laser melting ("DMLM") system.

FIG. 1 is a perspective view of an exemplary direct metal laser melting ("DMLM") system 100. In general, system 100 includes a base (or "baseplate") 102, a customizable powder bed containment system 104 ("powder bed containment system" or "containment system"), a laser scanner system 106, a controller 108, and a build plate 110.

Base 102 is any structure capable of supporting powder bed containment system 104. For example, in some embodiments, base 102 is a monolithic slab of granite. Those of skill will appreciate, however, that any structure capable of supporting powder bed containment system 104 in a stable configuration may be implemented.

In general, powder bed containment system 104 includes a plurality of interlinkable containment walls 112 mounted on (or capable of being mounted on) base 102 and/or build plate 110. Powder bed containment system 104 is described in greater detail below with reference to FIGS. 2-5.

Laser scanner system 106 is any suitable laser scanner system, such as a laser scanner system capable of one or more degrees of freedom of linear motion about one or more axes, such as about the x, y, and/or z-axes. In general terms, laser scanner system 106 may include at least one laser scanner 114, such as at least one commercially available raster scanning and/or vector scanning laser scanner. Laser scanner 114 may be mechanically coupled to and mounted on a gantry 116, which may permit laser scanner 114 to translate parallel to any of the x, y, and/or z-axes. In operation, laser scanner 114 may be positioned on gantry 116 relative to powder bed containment system 104, such that at least a portion of powder bed containment system 104 is within a field of view 118 of laser scanner 114. Within field of view 118, laser scanner 114 is capable of selectively welding powder deposited on build plate 110 of powder bed containment system 104.

For example, to construct an object, a layer of weldable powder, such as a layer of weldable metal powder, is deposited on build plate 110 within powder bed containment system 104. Laser scanner 116 translates on gantry 116 parallel to any of the x, y, and/or z axes, such as based upon a three-dimensional computer-aided design and drafting model (or "CAD model") associated with the object, and selectively welds the powder to construct a layer of the object. Powder deposition and welding operations continue in this manner, layer by layer, until construction of the object is completed.

In general, controller 108 coordinates welding and powder bed containment system operations performed by system 100. To this end, and in some embodiments, controller 108 includes one or more computer processors communicatively coupled to one or more tangible, non-transitory, computer-readable, memory devices. In some embodiments, controller 108 retrieves a three-dimensional CAD model from a computer-readable memory device and coordinates the motion and/or operations of one or more components of system 100, such as one or more components of powder bed containment system 104, to manufacture an object, such as an object corresponding to and/or defined by the CAD model, within powder bed containment system 104. For example, as described herein, controller 108 may coordinate the motion, position, orientation, and/or operations of powder bed containment system 104 and/or laser scanner system 106.

Figure 3:
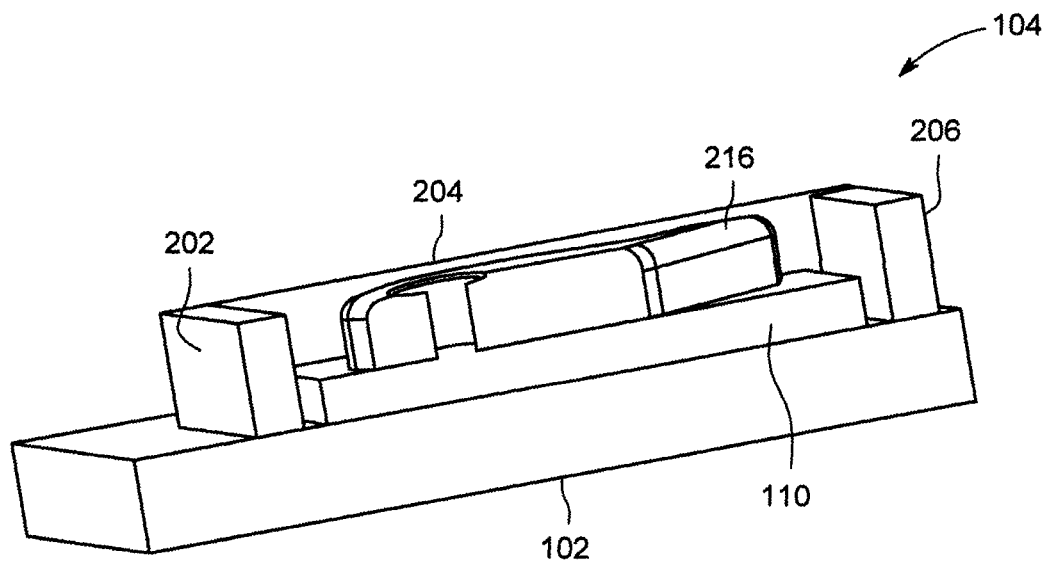
FIG. 3 is a cross-sectional view of the powder bed containment system shown in FIG. 2.

FIG. 2 is a perspective view of customizable powder bed containment system 104 (for use with DMLM system 100, as shown in FIG. 1). Similarly, FIG. 3 is a cross-sectional view of powder bed containment system 104.

Accordingly, and as described briefly above, powder bed containment system 104 includes interlinkable containment walls 112 (or "containment walls"). In the example shown, powder bed containment system 104 includes six interlinkable containment walls—specifically, a first interlinkable containment wall 202, a second interlinkable containment wall 204, a third interlinkable containment wall 206, a fourth interlinkable containment wall 208, a fifth interlinkable containment wall 210, and a sixth interlinkable containment wall 212. However, it will be appreciated that any suitable number of interlinkable containment walls may be implemented, such as, for example, and as described below, depending upon the complexity of an object to be welded and/or, in some cases, to approximate the shape of, or approximately surround, an object to be welded.

Each interlinkable containment wall 202-212 is configured to be mounted on base 102 and/or build plate 110 and interlinked with at least one other interlinkable containment wall 202-212. Specifically, containment walls 202-212 are configured to be selectively interlinked on base 102 and/or build plate 110 to create a customized powder bed 214 on build plate 110. As used herein, a "customized powder bed," such as powder bed 214, is the region enclosed by a plurality of interlinked containment walls, such as containment walls 202-212. Further, the shape of powder bed 214 may be adjusted and reconfigured based upon a shape of an object 216 to be fabricated. For example, containment walls 202-212 may be selectively interlinked based upon the shape of object 216, such that powder bed 214 approximates the shape of object 216. An example of this is shown at FIG. 2, where containment walls 202-212 surround object 216 and approximate the shape of object 216.

To accommodate objects of different shapes and sizes, containment walls 202-212 may differently shaped and/or sized. For example, some containment walls 202-212 may straight or elongated, while other containment walls 202-212 may include a curvature or an angle, such as, for example, an acute angle, an obtuse angle, and/or a right angle. During assembly, containment walls 202-212 may be interlinked based upon their respective shapes to achieve a desired customization. However, in at least some embodiments, containment walls 202-212 are not differently shaped; rather, in some embodiments, containment walls 202-212 are identical (e.g., where an object to be welded is a simple polygon, such as a square or a rectangle).

Containment walls 202-212 may be interlinked by one or more joints formed at the intersection of containment walls 202-212. Specifically, containment walls 202-212 may be configured to reciprocally engage one another, such as by way of one or more interlockable or interlinkable joints, such as one or more ball and socket joints, one or more tongue and groove joints, one or more dovetail joints, and/or any other suitable reciprocally engaging joint. In the example depicted at FIG. 2, a joint 218 is formed at the intersection of first interlinkable containment wall 202 and sixth interlinkable containment wall 212. Similarly, a variety of other joints 220-228 are formed between containment walls 202-212.

Containment walls 202-212 may also be mounted on or secured on base 102 and/or build plate 110 by any suitable mechanism. For example, in at least some embodiments, each containment wall 202-212 includes a mounting flange (not shown) configured to be removably mounted on base 102 and/or build plate 110, such as by way of one or more fasteners (e.g., screws or bolts). In another embodiment, containment walls 202-212 may be bonded on base 102 and/or build plate 110 by an impermanent adhesive. In another embodiment, containment walls 202-212 may be vacuum clamped on base 102 and/or build plate 110. In yet another embodiment, containment walls 202-212 may be magnetically mounted on and/or magnetically secured on base 102 and/or build plate 110 and/or clamped on base 102 and/or build plate 110, such as, for example, by one or more clamps.

Accordingly, and in operation, powder bed containment system 104 is configurable and reconfigurable on base 102 and/or build plate 110 based upon a shape of an object, such as object 216, to be welded. To configure powder bed containment system 104, a user may simply interlink a plurality of containment walls, such as containment walls 202-212, as desired. More particularly, a user may interlink a plurality of containment walls, such as containment walls 202-212, based upon the shape of the object, such as object 216, to be welded, such that the plurality of containment walls surround, and approximate the shape of, the object. In this manner, a customized powder bed, such as customized powder bed 214, may be created on build plate 110 within the region enclosed by the plurality of containment walls.

To reconfigure powder bed 214, containment walls 202-212 may be disengaged from one another, such as, for example, by separating or disengaging the joints formed between containment walls 202-212. Once containment walls 202-212 are separated (typically after manufacture of object 216 is complete), containment walls 202-212 may be reconfigured and interlinked in one or more different configurations on base 102 and/or build plate 110 to accommodate the construction of a differently shaped object. Thus, interlinkable containment walls 202-212 are recyclable or reusable for the creation of a variety of differently shaped objects over the course of a plurality of manufacturing cycles.

FIG. 4 is a cross-sectional view of one interlinkable containment wall 402 of customizable powder bed containment system 104 (shown in FIG. 2), in which interlinkable containment wall 402 is in a lowered position. Similarly, FIG. 5 is a cross-sectional view of interlinkable containment wall 402, in which interlinkable containment wall 402 is in a raised position. Although a single interlinkable containment wall 402 is described with respect to FIGS. 4 and 5, it will be appreciated that any of a plurality of interlinkable containment walls in powder bed containment system 104, such as any of containment walls 202-212, may include the features of containment wall 402 described below.

Accordingly, in at least some embodiments, an interlinkable containment wall, such as containment wall 402, may be telescoping and may include one or more actuators, such as a first actuator 404 and a second actuator 406. Actuators 404 and 406 may include any suitable actuator, such as any suitable linear actuator, and may be configured to raise and lower containment wall 402 axially relative to build plate 110. As used herein, and in at least some embodiments, the term "axially relative" means parallel to the z-axis. Specifically, actuators 404 and 406 may be configured to cause containment wall 402 to telescope incrementally as powder is deposited in layers within powder bed 214. For example, actuators 404 and 406 may raise containment wall 402 by an incremental distance that is substantially equal to the thickness of a single layer of powder, as powder is deposited in layers within powder bed 214. And, as additional layers of powder are deposited within powder bed 214, actuators 404 and 406 may continue to cause containment wall 402 to telescope by successive increments.

In the exemplary embodiment, actuators 404 and 406 are disposed internally within an interior portion (or cavity) of containment wall 402. However, in other embodiments, actuators 404 and 406 may be disposed radially outward of containment wall 402 and/or radially inward of containment wall 402 (e.g., outside of powder bed 214 and/or within powder bed 214). In each case, actuators 404 and 406 are mechanically coupled to containment wall and arranged, as described above, to raise and lower containment wall 402 as powder is deposited within powder bed 214.

In addition, in at least some embodiments, customizable powder bed containment system 104 may be packaged as a kit. For example, in some embodiments, a plurality of interlinkable containment walls, such as containment walls 202-212, may be packaged together as a kit and provided to an owner/operator of a DMLM system (e.g., DMLM system 100) for the purpose of constructing a customizable, reconfigurable, powder bed on a build plate of the DMLM system.

Embodiments of the present disclosure thus relate to a customizable powder bed containment system in which a plurality of interlinkable containment walls are selectively interlinked or joined to form a customized powder bed on a build plate of a direct metal laser melting (DMLM) system. The interlinkable containment walls may be of different shapes and/or sizes and may be interlinked on the build plate to conform to the shape of, or approximately surround, an object to be welded. In addition, the interlinkable containment walls are configured to reciprocally engage with one another and are also capable of disengaging, such that the walls can be repeatedly reconfigured to accommodate objects of varying shapes and sizes.

Exemplary technical effects of the customizable powder bed containment system described herein include, for example: (a) construction of a customized powder bed on a build plate of a DMLM system; (b) conservation of weldable powder during operation of the customizable powder bed containment system; and (c) a plurality of telescoping interlinkable containment walls that are raised, layer by layer, to accommodate successive layers of weldable powder deposited on the customized powder bed.

Exemplary embodiments of a customizable powder bed containment system and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with the systems and related methods as described herein. Rather, the exemplary embodiment can be implemented and utilized in connection with many applications where additive manufacturing is desired.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A customizable powder bed containment system for use with a direct metal laser melting (DMLM) system, said customizable powder bed containment system comprising:
   a plurality of interlinkable containment walls mechanically coupleable on a build plate of the DMLM system, each interlinkable containment wall of said plurality of interlinkable containment walls further mechanically coupleable to another interlinkable containment wall of said plurality of interlinkable containment walls, wherein a first interlinkable containment wall of said plurality of interlinkable container walls defines a cavity therein; and
   at least one actuator mechanically coupled to said first interlinkable containment wall and positioned within the cavity of said first interlinkable containment wall, said at least one actuator operable to selectively raise said first interlinkable containment wall axially relative to a build surface of the build plate.

2. The customizable powder bed containment system of claim 1, wherein said first interlinkable containment wall has a different shape than at least one other interlinkable containment wall of said plurality of interlinkable containment walls.

3. The customizable powder bed containment system of claim 1, wherein said plurality of interlinkable containment walls are configured to be at least one of i) vacuum clamped on the build plate and ii) magnetically coupled on the build plate.

4. The customizable powder bed containment system of claim 1, wherein each interlinkable containment wall of said plurality of interlinkable containment walls comprises at least one joint.

5. The customizable powder bed containment system of claim 1, wherein each interlinkable containment wall of said plurality of interlinkable containment walls is identical.

6. The customizable powder bed containment system of claim 1, wherein each interlinkable containment wall of said plurality of interlinkable containment walls is capable of telescoping axially relative to the build surface of the build plate.

7. The customizable powder bed containment system of claim 1, further comprising a plurality of actuators, each actuator of said plurality of actuators mechanically coupled to a respective one of said plurality of interlinkable containment walls.

8. The customizable powder bed containment system of claim 7, wherein said plurality of interlinkable containment walls are configured to be selectively raised incrementally by said plurality of actuators as successive layers of powder are deposited on the build surface of the build plate.

9. A kit for customizing a powder bed on a build plate of a direct metal laser melting (DMLM) system, said kit comprising:
   a plurality of interlinkable containment walls, each interlinkable containment wall of said plurality of interlinkable containment walls mountable on the build plate of the DMLM system, each interlinkable containment wall of said plurality of interlinkable containment walls further configured to be selectively interlinked with at least one other interlinkable containment wall of said plurality of interlinkable containment walls, wherein a first interlinkable containment wall of said plurality of interlinkable container walls defines a cavity therein; and
   at least one actuator mechanically coupled to said first interlinkable containment wall and positioned within the cavity of said first interlinkable containment wall, said at least one actuator operable to selectively raise said first interlinkable containment wall axially relative to a build surface of the build plate.

10. The kit of claim 9, wherein said first interlinkable containment wall has a different shape than at least one other interlinkable containment wall of said plurality of interlinkable containment walls.

11. The kit of claim 9, wherein said plurality of interlinkable containment walls are configured to be at least one of i) vacuum clamped on the build plate and ii) mechanically coupled on the build plate.

12. The kit of claim 9, wherein each interlinkable containment wall of said plurality of interlinkable containment walls is identical.

13. The kit of claim 9, wherein each interlinkable containment wall of said plurality of interlinkable containment walls comprises at least one joint.

14. The kit of claim 9, wherein each interlinkable containment wall of said plurality of interlinkable containment walls is capable of telescoping axially relative to the build surface of the build plate.

15. The kit of claim 9, wherein said first interlinkable containment wall is configured to be selectively raised incrementally by said at least one actuator as successive layers of powder are deposited on the customized powder bed.

16. A kit for customizing a powder bed on a build plate of a direct metal laser melting (DMLM) system, said kit comprising:
   a plurality of containment walls, each containment wall of said plurality of containment walls engageable with at least one other containment wall of said plurality of containment walls, wherein a first containment wall of said plurality of container walls defines a cavity therein; and
   at least one actuator mechanically coupled to said first containment wall and positioned within the cavity of said first containment wall, said at least one actuator operable to selectively raise said first containment wall axially relative to the build plate.

17. The customizable powder bed containment system of claim 1, wherein said first interlinkable containment wall is coupled to a second interlinkable containment wall of said plurality of interlinkable container walls, and wherein a joint spans an intersection formed between said first interlinkable containment wall and said second interlinkable containment wall.

18. The customizable powder bed containment system of claim 17, wherein said joint comprises at least of a ball and socket joint, a tongue and groove joint, and a dovetail joint.

19. The customizable powder bed containment system of claim 18, wherein said joint comprises a ball and socket joint.

20. The customizable powder bed containment system of claim 1, wherein said first interlinkable containment wall extends axially from a first end mechanically coupleable on the build surface of the build plate, to an opposite second end, the build surface configured to receive successive layers of powder thereon.

\* \* \* \* \*